United States Patent [19]
Latham et al.

[11] Patent Number: 5,437,150
[45] Date of Patent: Aug. 1, 1995

[54] FLUID PRODUCTION METHOD AND APPARATUS

[75] Inventors: Paul M. Latham, Maidenhead; John T. Lavin, Guildford, both of England

[73] Assignee: The BOC Group, plc, Surrey, England

[21] Appl. No.: 306,845

[22] Filed: Sep. 14, 1994

Related U.S. Application Data

[63] Continuation of Ser. No. 182,305, Jan. 13, 1994, abandoned, and a continuation of Ser. No. 883,627, May 13, 1992, abandoned.

[30] Foreign Application Priority Data

May 23, 1991 [GB] United Kingdom .................. 9111157

[51] Int. Cl.$^6$ ........................ F02G 3/00; F02C 6/00
[52] U.S. Cl. ................ 60/39.02; 60/39.12; 60/39.181
[58] Field of Search .......... 60/39.02, 39.12, 39.181; 62/39, 44

[56] References Cited

U.S. PATENT DOCUMENTS

| | | |
|---|---|---|
| 3,868,817 | 3/1975 | Marion et al. .............. 60/39.02 |
| 4,019,314 | 4/1977 | Springmann ............... 60/39.12 |
| 4,488,398 | 12/1984 | Noguchi ..................... 60/39.12 |
| 4,590,760 | 5/1986 | Goebel et al. ............... 60/39.12 |
| 4,608,818 | 9/1986 | Goebel et al. ............... 60/39.12 |
| 4,631,915 | 12/1986 | Frewer et al. ............... 60/39.12 |
| 4,651,519 | 3/1987 | Goebel et al. ............... 60/39.12 |
| 4,663,931 | 5/1987 | Schiffers et al. ............ 60/39.12 |
| 4,665,688 | 5/1987 | Schiffers et al. ............ 60/39.12 |
| 4,676,063 | 6/1987 | Goebel et al. ............... 60/39.12 |
| 4,861,369 | 8/1989 | von Bogdandy et al. ... 75/38 |
| 4,885,014 | 12/1989 | Reinhardt ................... 55/484 |
| 4,996,836 | 3/1991 | Reh et al. ................... 60/39.12 |
| 5,080,703 | 1/1992 | Rathbone .................... 60/39.12 |
| 5,081,845 | 1/1992 | Allam et al. ................ 60/39.12 |

FOREIGN PATENT DOCUMENTS

| | | |
|---|---|---|
| 0081178 | 6/1983 | European Pat. Off. . |
| 0269609 | 6/1988 | European Pat. Off. . |
| 0282321 | 9/1988 | European Pat. Off. . |
| 0367428 | 5/1990 | European Pat. Off. . |
| 0402045 | 12/1990 | European Pat. Off. . |
| 3908505 | 9/1989 | Germany . |

Primary Examiner—Richard A. Bertsch
Assistant Examiner—Howard R. Richman
Attorney, Agent, or Firm—David M. Rosenblum; Larry R. Cassett

[57] ABSTRACT

Iron ore, coal and oxygen are fed to a reactor to produce iron and a fuel gas. The fuel gas leaves the reactor at a temperature of at least 200° C. and is passed through a hot filtration apparatus. The resulting hot, filtered gas then passes through a heat exchanger. A heat exchange fluid, preferably a stream of nitrogen at above ambient pressure passes through the heat exchanger countercurrently to the hot filtered as stream. The heat exchange fluid is thereby heated. The hot heat exchange fluid stream is then expanded with the performance of external work in an expansion turbine, for example it may be used in the generation of electrical power. The hot, filtered, fuel gas may be sent for power recovery downstream of the heat exchanger or may be separated into its constituent components. If the heat exchange fluid is nitrogen it may be separated from air in the same plant that is used to feed the reactor with oxygen.

7 Claims, 3 Drawing Sheets

FLUID PRODUCTION METHOD AND APPARATUS

This is a continuation of application Ser. No. 08/182,305 filed 13 Jan. 1994 and a continuation of application Ser. No. 07/883,627 filed 13 May 1992, both of which are now abandoned.

BACKGROUND OF THE INVENTION

This invention relates to a method and apparatus for producing a hot fluid stream from which power can be recovered.

It is known to generate power from a fuel gas by compressing the fuel gas, burning it in a combustion chamber employing compressed air to support combustion, and expanding the products of combustion in a turbine. The turbine is used to drive an alternator and hence generate electrical power. Known sources of suitable fuel gas include reactors in which the direct reduction of iron oxide to form iron and/or the gasification of coal are performed. In these examples, the fuel gas is produced at an elevated temperature and is laden with particulates. The fuel gas is scrubbed to remove the particulates and is cooled to ambient temperature.

Frequently, the process producing the fuel gas requires a supply of commercially pure oxygen or oxygen-enriched air. The oxygen or oxygen-enriched air is frequently produced by a plant that operates on the same site as the reactor in which the fuel gas is produced. Nitrogen is produced by the plant in addition to oxygen.

There are a number of proposals in the art for recovering work from the nitrogen. In some proposals, the nitrogen is compressed and then passed to the gas turbine in which the fuel gas combustion products are expanded. The nitrogen may be passed directly into the expansion turbine or into a region upstream thereof. By this means, most if not all of the energy requirements of the air separation can be met. Examples of such methods are included in U.S. Pat. Nos. 2,520,862 and 3,771,495.

It has also been proposed in our European patent application EP-A-402 045 to recover work from nitrogen by heat exchanging it at elevated pressure with a hot gas stream and then expanding the resulting warmed nitrogen with the performance of external work.

None of the prior processes discussed above provides a means for making use of the elevated temperature of the fuel gas in the generation of power.

SUMMARY OF THE INVENTION

According to the present invention there is provided a method of producing a hot fluid stream from which power can be recovered comprising performing at elevated temperature a chemical reaction or reactions to form a fuel gas, filtering the fuel gas at a temperature of at least 200° C. to remove particulates therefrom, and heat exchanging the hot filtered gas with a stream of heat exchange fluid so as to raise the temperature of said stream of heat exchange fluid and thereby provide it as the hot fluid stream.

The invention also provides apparatus for producing a hot fluid stream from which power can be recovered, comprising a reactor for forming a fuel gas at elevated temperature, hot gas filtration means which is able to remove particulates from the hot gas and which communicates with said reactor, and a heat exchanger for heat exchanging the filtered hot gas with a stream of heat exchange fluid so as to raise the temperature of said stream of heat exchanger fluid and thereby enable it to be provided as the hot fluid stream.

The heat exchange fluid preferably comprises compressed gas. The resulting hot compressed gas stream is preferably expanded in a first expansion turbine without being mixed with any other gaseous stream to enable power to be generated. It is particularly preferred that the gaseous heat exchange stream be formed of nitrogen when the reaction or reactions by which the fuel gas is formed employ pure oxygen or oxygen-enriched air. In such examples of the method according to the invention, both the oxygen and nitrogen can be produced by separation of an air stream. The air stream is preferably separated by being rectified. The rectification of the air is preferably performed in a double column comprising a lower pressure stage and a higher pressure stage. There is preferably a condenser-reboiler associated with the two said stages of the double column so as to provide reboil for the lower pressure stage and reflux for both stages. The lower pressure stage preferably has an operating pressure (at its top) in the range of 3 to 6 atmospheres absolute. Provided there is a demand for oxygen at a pressure of at least 3 atmospheres and no demand for argon, operation of the lower pressure column in this range makes possible more efficient separation of the air than that possible at the more conventional operating pressures in the range of 1 to 2 atmospheres absolute. Moreover, depending on the temperature of the filtered hot fuel gas stream, it is typically desirable not to compress the nitrogen stream upstream of its heat exchange therewith. Generally, if the temperature of the filtered hot gas is below 450° C., the lower pressure stage of the double rectification column may be operated at a pressure of up to 6 atmospheres absolute such that no further compression of the nitrogen upstream of its heat exchange with the filtered hot gas is desirable. At higher temperatures of the filtered gas stream, it becomes desirable to use a higher pressure nitrogen stream; in such examples compression of the stream intermediate the low pressure rectification column and the heat exchanger is preferably performed.

Suitable hot gas filtration means for use in the method and apparatus according to the invention are described in, for example, U.S. Pat. No. 4,885,014, WO-A-87/07181 and a paper entitled "High Performance Dust Removal from Process-and Flue-gases, between Ambient Temperature and 1000° C., by Means of Asymmetric Porous Ceramics", M. Durst, M. Mueller, H. Vollmer, Staub-Reinhalting der Luft, 48 (1988), pp 197–202. The filters described therein are capable of operating at temperatures up to 1,000° C.

The fuel gas may, for example, be produced by a process for the reduction of iron ore which employs coal as a source of reducing gas. Examples of such processes are described in a paper entitled "Coal-based iron-making", R. B. Smith and M. J. Corbett, Ironmaking and Steelmaking (1987) 14, pp 49–56. The KR process referred to therein at p 53 is now known as the COREX process. It typically produces a fuel gas at a temperature in the range of 250° to 300° C.

Downstream of its heat exchange with the heat exchange fluid, the fuel gas may be employed for general heating purposes; may be subjected to separation in order to increase its calorific value or to obtain pure gases therefrom (for example hydrogen and/or carbon monoxide); or may be subjected to combustion for the purposes of producing a gas stream from which work can be recovered by expansion in a second turbine. The second turbine may be coupled to a compressor, or may be used to drive an alternator so as to generate electrical power. Intermediate the heat exchanger and a combustion chamber in which it is burnt, the fuel gas may be compressed to a pressure compatible with the operating pressure of the second turbine. In such arrangements, the combustion chamber preferably communicates with an air compressor which provides the stoichiometric requirement of air for the combustion of the fuel gas. If desired, a part of the compressed air from such compressor may be diverted from the combustion chamber to provide the air which is separated to produce oxygen and nitrogen for use in preferred examples of the method according to the invention. It is further preferred in such examples that a stream of nitrogen separated from the air be introduced into the turbine for expanding the combustion gases so as to compensate for the air diverted from the compressor that feeds the combustion chamber associated with such turbines. If desired, a stream of combustion products leaving the second turbine may be heat exchanged with the stream of nitrogen passing to the second turbine so as to preheat said stream of nitrogen.

It is not essential in the method and apparatus according to the invention to employ nitrogen as the heat exchange fluid. If desired, steam may be so employed. It is also possible to use the products of combustion of the fuel gas downstream of its heat exchange with the heat exchange fluid as a source of hot gas for raising steam, and then to expand this steam in a turbine which drives an alternator so as to enable electrical power to be generated thereby. A further alternative of an example of the method and apparatus according to the invention is to employ a heat exchange oil as the heat exchange fluid. The resulting hot heat exchange oil may then be heat exchanged with a gas such as nitrogen or with steam and the resulting hot nitrogen or superheated steam expanded in a turbine with the generation of electrical power.

The method and apparatus according to the invention make possible the generation of a considerably greater amount of electrical power than can be obtained from a comparable method and apparatus in which the fuel gas is cooled to ambient temperature before filtration. Moreover, in examples of the method and apparatus according to the invention in which the reaction or reactions that generate the fuel gas employ oxygen, at least some and typically all the power requirements of the air separation plant may be met by recovery of energy from the hot filtered fuel gas.

BRIEF DESCRIPTION OF THE DRAWINGS

The method and apparatus will now be described by way of example with reference to the accompanying drawings, in which.

The drawings are not to scale.

DETAILED DESCRIPTION

Figure 1:
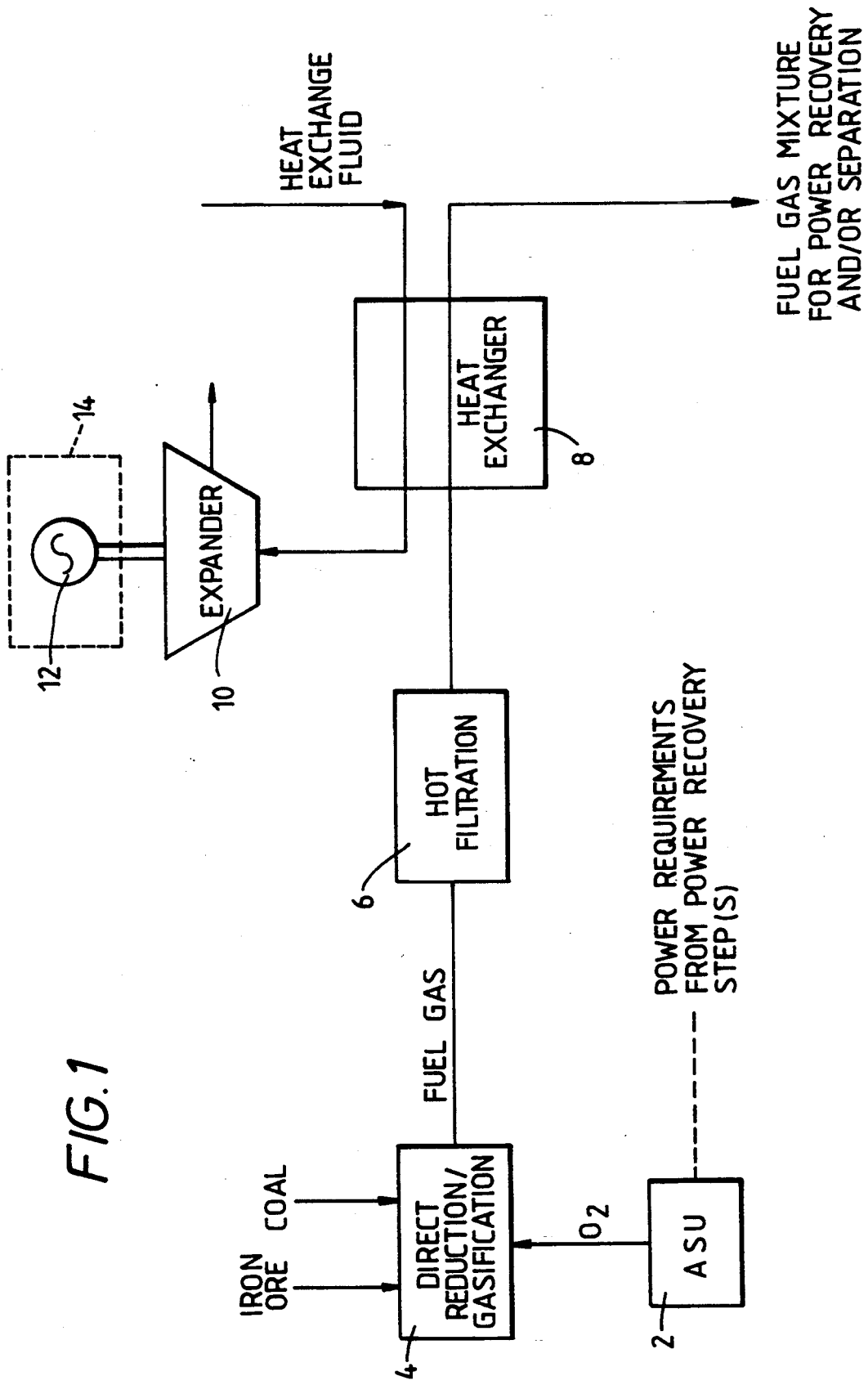
FIG. 1 is a schematic flow diagram illustrating a first plant for generating power from a fuel gas.

Referring to FIG. 1 of the drawings, there is shown an air separation plant 2 which provides the stream of oxygen (typically containing up to 5% by volume of gaseous impurities) to a reactor 4 in which iron ore and coal are reacted to produce iron and a fuel gas. The fuel gas leaves the reactor 4 typically at a temperature of up to 500° C. and is then passed through hot filtration apparatus 6 which is preferably of the kind described hereinabove. The filtration apparatus 6 is effective to remove substantially all solid particles from the fuel gas. The hot fuel gas is then passed into a heat exchanger 8 through which it flows countercurrently to a heat exchange fluid which is preferably nitrogen (but may, for example, alternatively be steam). The heat exchange fluid is thereby heated typically from ambient temperature to a temperature up to 50° C. less than the temperature at which the hot gas enters the heat exchanger 8. The heat exchange fluid then passes into an expansion turbine (typically at a pressure in the range of 4 to 10 atmospheres absolute). The turbine 10 drives an alternator 12 forming part of a power station 14 and thereby enables electricity to be generated.

The fuel gas that leaves the heat exchanger 8 may be separated to produce pure gaseous products or may itself be used to generate further electrical power. The power thus generated may be used to meet all the requirements for electrical power of the air separation plant 2.

Figure 2:
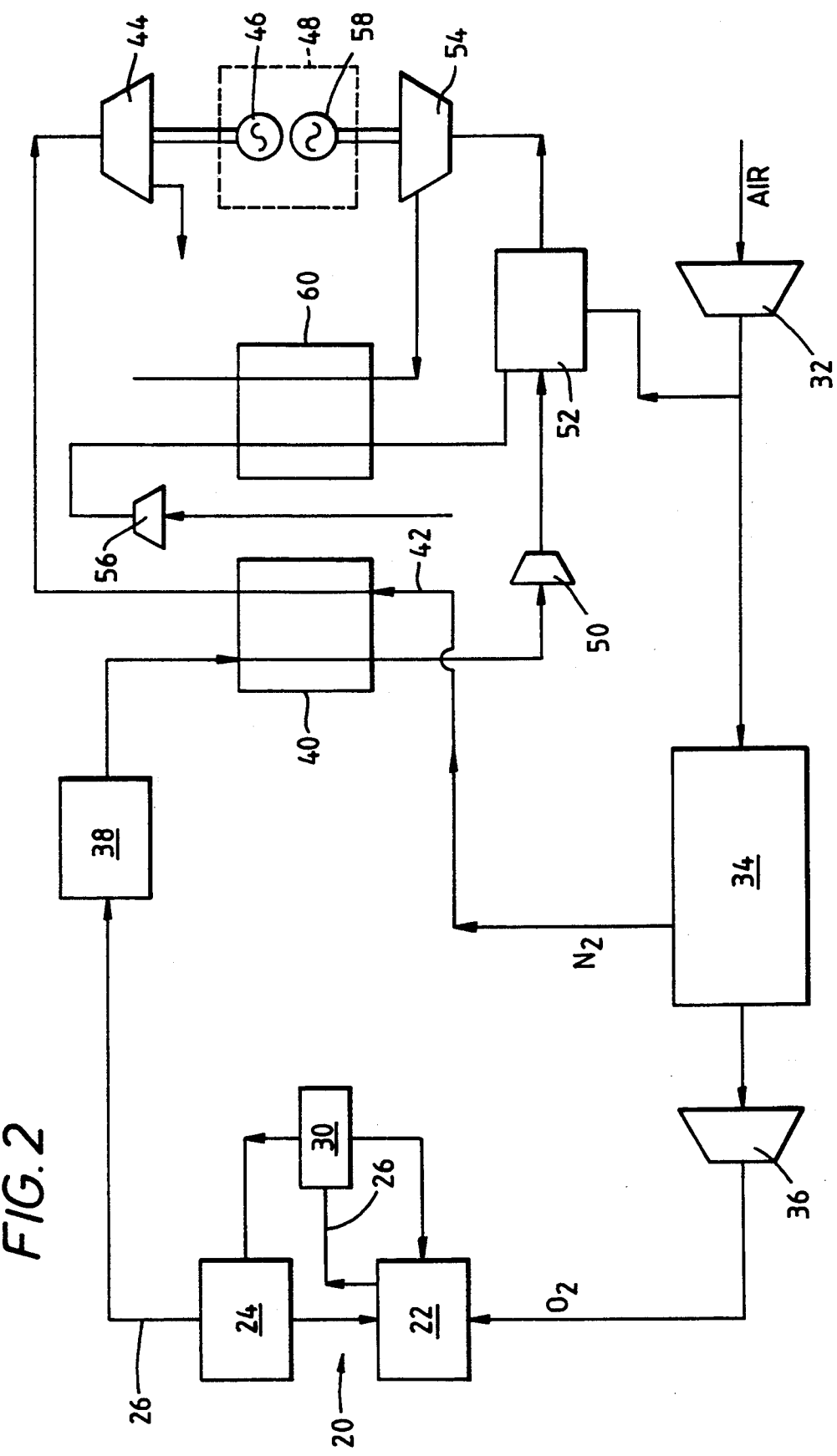
FIG. 2 is a schematic flow diagram of a second plant which includes means for generating electrical power from a fuel gas, the fuel gas being produced by a reactor that firstly reduces iron oxide to iron by reaction with coal and secondly gasifies the coal to produce the fuel gas.

Referring now to FIG. 2 of the drawings, there is shown a specific example of the kind of plant generally illustrated in FIG. 1. Referring to FIG. 2, a reactor 20 for the direct reduction of iron oxide and for the production of a fuel gas comprises a gasifier 22 and a vertical shaft reduction furnace 24. Measured quantities of lump, pelletised or sinter iron oxide ore, lime and dolomite are charged directly into the top of the furnace 24. Simultaneously, a reduction gas comprising carbon monoxide and hydrogen is blown into the shaft furnace 24 at an intermediate region thereof. The reduction gas moves upwards against a descending flow of ore to the top where it is drawn off via a conduit 26. While descending through the hot gas, lime and dolomite are calcined and the ore is reduced to sponge iron. Screw conveyers (not shown) are employed to extract the sponge iron from the bottom of the shaft furnace 24 at a desired rate and the extracted sponge iron is allowed to fall under gravity directly into the gasifier 22. The gasifier 22 is of a kind having a hearth (not shown) at its bottom a fluidised bed into which coal is fed, and an uppermost free board zone. Oxygen is blown through tuyeres (not shown) into the fluidised bed region of the gasifier 22, and the coal is thereby gasified. The resulting gas is withdrawn through a conduit 28, is passed through a cyclone 30 and is then divided. Part of the flow provides the gas for the furnace 24 while the remainder is returned to the gasifier 22. Sponge iron falling under gravity into the fluidised bed region of the gasifier 22 is melted. Liquid iron and slag, comprising coal ash, lime and dolomite, drop into the hearth and separate naturally into two layers owing to the difference in density between the heavier iron and the lighter slag. Liquid iron can thus be withdrawn from the bottom of the gasifier 22.

Operation of such reduction furnaces-cum-gasifiers are well known in the art and the above description is merely a brief summary of the way in which they operate. One example of process for operating such plant is the COREX process.

The oxygen for the reactor 20 is provided by taking an air stream and compressing it in a compressor 32. A minor portion of the compressed air stream is then passed into a cryogenic air separation plant 34, in which the air is separated into oxygen and nitrogen by rectification. An oxygen stream is withdrawn from the plant 34, is compressed in a compressor 36 to the operating pressure of the gasifier, and is then passed into the gasifier 22 to provide its oxygen requirements.

The fuel gas passing out of the top of the furnace 24 typically has the following composition: carbon monoxide 40 to 43% by volume; carbon dioxide 34 to 37% by volume; hydrogen 17 to 18% by volume; water vapour 1.5% by volume; methane 0.5% by volume; nitrogen 3 to 4% by volume and a calorific value in the range of 7.5 to 8 MJ/Nm$^3$. (1 Nm$^3$ of gas is the quantity of gas that occupies 1 cubic meter at 0° C. and 1 atmosphere absolute). The fuel gas typically leaves the top of the furnace 24 at a temperature in the range of 250° to 300° C. It is filtered at this temperature by hot filtration means 38 which may be of the kind previously described herein. The resulting hot, filtered, fuel gas stream is then passed through a heat exchanger 40 in countercurrent heat exchange to a stream of nitrogen taken via conduit 42 from the air separation plant 34. The nitrogen is typically produced at a pressure in the range of 2 to 6 atmospheres absolute by the plant 34. The stream of nitrogen passing through the heat exchanger 40 is warmed to a temperature typically in the order of 250° C. and is then expanded in an expansion turbine 44 without being mixed with any other gas. The turbine 44 is employed to drive an alternator 46 forming part of a power station 48. The gas leaving the expansion turbine 44 is typically vented to the atmosphere via a stack (not shown). Accordingly, electricity is able to be generated from the heat contained in the fuel gas leaving the reducing furnace 24.

Further power is generated by combustion of the fuel gas stream leaving the heat exchanger 40 after its heat exchange with the nitrogen stream. To this purpose, the fuel gas is compressed in a compressor 50 to the same pressure as that to which the air is compressed in the compressor 32. The resulting compressed fuel gas is then passed into a combustion chamber 52 associated with a turbine 54. Combustion of the fuel in the chamber 52 is supported by the major portion of the stream of compressed air produced by the compressor 32. Typically, the compressor 32, the combustion chamber 52 and the expansion turbine 54 form a single piece of plant with the turbine 32 and the compressor 54 each having rotors (not shown) mounted on the same shaft, whereby the expansion turbine 54 is effective to drive the compressor 32. The compressor 32 is typically of a size that enables a chosen rate of combustion of fuel gas to be achieved in the chamber 52 and hence hot combustion products to be provided to the turbine 54 at a chosen rate. It is desirable to compensate for the shortfall in the production of combustion products in the chamber 52 resulting from the by-passing of a minor portion of a compressed air from the compressor 32 to the air separation plant 34, and thus ensure that the turbine 54 is able to operate efficiently. This compensation is performed by taking a stream of nitrogen from the air separation plant 34 and compressing it in a compressor 56 to approximately the operating pressure of the chamber 52. The resulting stream of compressed nitrogen is then mixed with the combustion products produced in the chamber 52, and the resulting mixed gas stream expanded in the turbine 54. The turbine 54 as well as providing drive for the compressor 32 also drives an alternator 58 forming part of the power station 48.

If desired, a stream of combustion products exiting the turbine 54 may be employed to pre-heat the compressed nitrogen upstream of its being mixed with the combustion products produced in the chamber 52. The pre-heating may be effected by countercurrent heat exchange in a heat exchanger 60. If necessary, an additional heat exchanger stream may be employed in the heat exchanger 60 to heat the nitrogen to a desired temperature. The waste gases from the turbine 54 are typically vented to the atmosphere via a stack (not shown).

Figure 3:
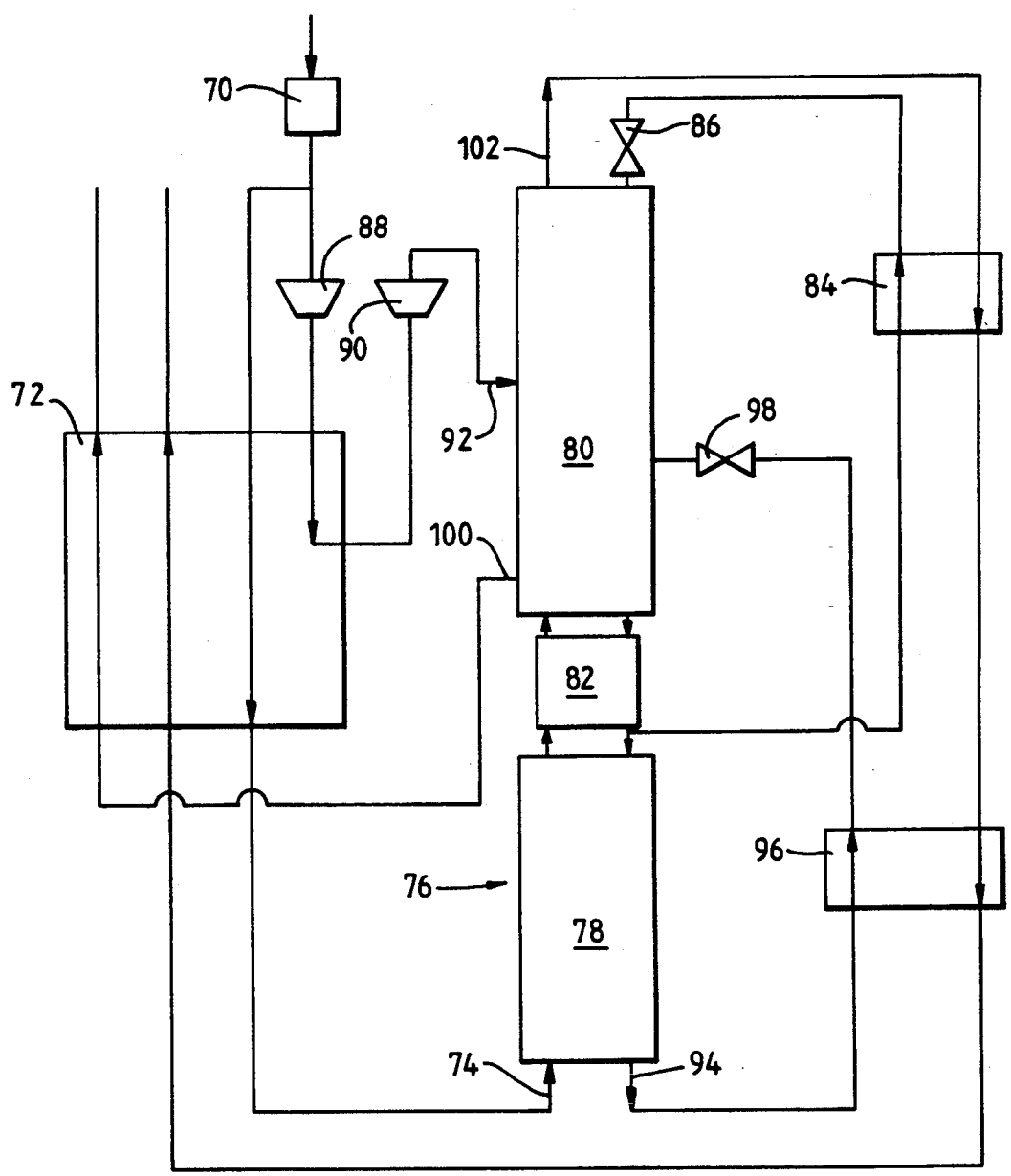
FIG. 3 is a schematic flow diagram of an air separation plant for use in the plant shown in FIGS. 1 and 2.

Referring now to FIG. 3, there is shown an air separation unit which may be used as part of the plant shown in FIG. 1 or FIG. 2 of the accompanying drawings. A compressed air stream is passed through a purification apparatus 70 effective to remove water vapor and carbon dioxide from the compressed air. The apparatus 70 is of a kind which employs beds of adsorbent to adsorb water vapor and carbon dioxide from the incoming air. The beds may be operated out of sequence with one another such that while one or more beds are being used to purify air, then the others are being regenerated, typically by means of a stream of nitrogen. The purified air stream is divided into major and minor streams.

The major stream passes through a heat exchanger 72 in which its temperature is reduced to a level suitable for the separation of air by rectification. Typically, therefore, the major air stream is cooled to its saturation temperature at the prevailing pressure. The major air stream is then introduced from the heat exchanger 72 through an inlet 74 into a higher pressure stage 78 of a double rectification column 76 having in addition to the stage 78, a lower pressure stage 80. Both rectification stages 78 and 80 contain liquid-vapor contact trays (not shown) and associated downcomers (not shown) (or other means for effecting intimate contact between the descending liquid phase and an ascending vapor phase) whereby a descending liquid phase is brought into intimate contact with an ascending vapor phase such that mass transfer occurs between the two phases. The descending liquid phase becomes progressively richer in oxygen and the ascending vapor phase progressively richer in nitrogen. The higher pressure rectification stage 78 operates at a pressure similar to that to which the incoming air is compressed and separates the air into an oxygen-enriched air fraction and a nitrogen fraction. The lower pressure stage 80 is preferably operated so as to give a substantially pure nitrogen fraction at its top but an oxygen fraction as its bottom which still contains an appreciable proportion of impurities (primarily argon and nitrogen) (say, up to 5% by volume). The stages 78 and 80 are linked by a condenser-reboiler 82. The condenser-reboiler 82 receives nitrogen vapor from the top of the higher pressure stage 78 and condenses it by heat exchange with boiling liquid oxygen in the stage 80. The resulting condensate is returned to the higher pressure stage 78. Part of the condensate provides reflux for the stage 78, while the remainder is collected, subcooled in a heat exchanger 84 and passed into the top of a lower pressure stage 80 through an expansion valve 86 and thereby provides reflux for the stage 80. The lower pressure rectification stage 80 operates at a pressure lower than that of the stage 78 and receives oxygen-nitrogen mixture for separation from two sources. The first source is the minor air stream formed by dividing the stream of air leaving the purification apparatus 70. Upstream of its introduction into the stage 80, the minor air stream is compressed in a compressor 88 having an aftercooler (not shown) associated therewith, is then cooled to a temperature of about 200 K. in the heat exchanger 72, is withdrawn from the heat exchanger 72, and is expanded in an expansion turbine 90 to the operating pressure of the stage 80, thereby providing refrigeration for the process. This air stream is then introduced into the lower pressure stage 80 through an inlet 92. If desired, the expansion turbine 90 may be employed to drive the compressor 88, alternatively the two machines, namely the compressor 88 and the turbine 90 may be independent of one another. If desired, the compressor 88 may be omitted, and the turbine 90 used to drive an electrical power generator (not shown).

The second source of oxygen-nitrogen mixture separation the lower pressure rectification stage 80 is a liquid stream of oxygen-enriched fraction taken from the bottom of the higher pressure stage 78. This stream is withdrawn through an outlet 94, is sub-cooled in a heat exchanger 96 and is then passed through a Joule Thomson valve 98 and flows into the stage 80 at intermediate level thereof.

The apparatus shown in FIG. 3 of the drawings produces a product oxygen stream and a product nitrogen stream. The product oxygen stream is withdrawn as vapor from the bottom of the lower pressure stage 80 through an outlet 100. This stream is then warmed to approximately ambient temperature in the heat exchanger 72 by countercurrent heat exchange with incoming air. A nitrogen product stream is taken directly from the top of the lower pressure rectification stage 80 through an outlet 102. This nitrogen stream flows through the heat exchanger 84 countercurrently to the liquid nitrogen stream withdrawn from the higher pressure stage 78 and effects the sub-cooling of the stream. The nitrogen product stream then flows through the heat exchanger 96 countercurrently to the liquid stream of oxygen-enriched fraction and effects the sub-cooling of this liquid stream. The nitrogen stream flows next through the heat exchanger 72 countercurrently to the major air stream and is thus warmed to approximately ambient temperature.

We claim:

1. A method of producing a hot fluid stream from which power can be recovered comprising performing at elevated temperature at least one chemical reaction in which pure oxygen or oxygen-enriched air is employed to form a fuel gas; filtering the fuel gas at a temperature of at least 200° C. to remove particulates therefrom; heat exchanging the hot filtered gas with a stream of heat exchange fluid comprising gaseous nitrogen so as to raise the temperature of said stream of heat exchange fluid and thereby provide it as the hot fluid stream; expanding the hot fluid stream in a first expansion turbine without mixing said hot fluid stream with any other gaseous stream to enable power to be generated; downstream of the heat exchange of the fuel gas with the heat exchange fluid, subjecting said fuel gas to combustion to produce a gas stream from which work is recovered by expansion in a second expansion turbine used in generating electrical power; and separating an air stream to produce both said nitrogen and said pure oxygen or oxygen-enriched air, a same compressor acting as the source of air for said separation and for supporting combustion of the fuel gas.

2. The method as claimed in claim 1, in which the heat exchange fluid comprises compressed gas.

3. The method as claimed in claim 1, in which the air stream is separated by being rectified in a double column comprising a lower pressure stage and a higher pressure stage, the lower pressure stage having an operating pressure at its top in a range of between about 3 and 6 atmospheres absolute and the heat exchange fluid comprises a nitrogen heat exchange stream withdrawn from the lower pressure stage of the double column.

4. The method as claimed in claim 3, in which the nitrogen heat exchange stream is not subject to any compression intermediate its withdrawal from the lower pressure stage of the double column and its heat exchange with the fuel gas.

5. The method as claimed in claim 1, in which the fuel gas is compressed intermediate its heat exchange with the heat exchange fluid stream and its combustion.

6. The method as claimed in claim 1, in which part Of the nitrogen heat exchange stream is mixed with the fuel gas in a combustion chamber.

7. The method as claimed in claim 6, in which a stream of combustion products leaving the second turbine is heat exchanged with the part of the nitrogen heat exchange stream that is mixed with the fuel gas so as to pre-heat said part of the nitrogen heat exchange stream.

* * * * *